June 12, 1962 W. S. HOSEK 3,038,485
BUTTERFLY SUPPORTED FRANGIBLE DISC VALVE
Filed July 26, 1961 2 Sheets-Sheet 2

INVENTOR.
WILLIAM S. HOSEK
BY
AGENT

United States Patent Office 3,038,485
Patented June 12, 1962

3,038,485
BUTTERFLY SUPPORTED FRANGIBLE
DISC VALVE
William S. Hosek, Mount Tabor, N.J., assignor to Thiokol Chemical Corporation, Bristol, Pa., a corporation of Delaware
Filed July 26, 1961, Ser. No. 127,030
8 Claims. (Cl. 137—68)

This invention relates in general to butterfly valves and has particular reference to butterfly valves of the type that is initially hermetically sealed in closed position by a shearable sealing sheet of frangible material affixed to the movable valve member and marginally united with the valve body.

In valves of this type, pressure surges on the movable valve member can cause a strain on the hermetic sealing sheet with possible damage thereto. It, therefore, is the primary object of my present invention to provide a safety device to immobilize the valve member against the influence of pressure surges and thereby prevent accidental shearing of the sealing sheet, or other damage such as might render the initial seal inoperative while the valve is in its intentionally closed position.

To be more explicit, I have positioned a stop abutment in a position inside the valve body where it will be contacted by the hermetic sealing sheet on the movable valve member when the latter reaches closed position on its seat. Then, the operating mechanism is preloaded to press the movable valve member with its hermetic sealing sheet hard against the stop abutment so that it cannot yield to surge in the line. To this preloading means there is opposed valve-opening load means capable of overbalancing the said preloading means at the will of an operator when it is desired to open the valve.

This invention permits a hermetic barrier type butterfly valve to sustain high pressure loads in the fluid conduit which it controls, in the unsheared closed position, without requiring critical tolerances on the thickness of the shearable disk. It also removes all backlash or clearance from the system and fixes the moving parts. This will help to reduce any vibration problems.

A further object is to provide shearable means to secure the valve-operating mechanism positively in valve-closed condition. The power of the valve-opening load means is made sufficient to shear the securing means and thereby render it inoperative at the desired time.

Another object is to provide specific valve loading means of simple, compact and inexpensive construction which will be efficient in operation and not likely to get out of order.

Still further objects, advantages and features will become apparent as the following specific description is read in connection with the accompanying drawing, in which.

Figure 1:
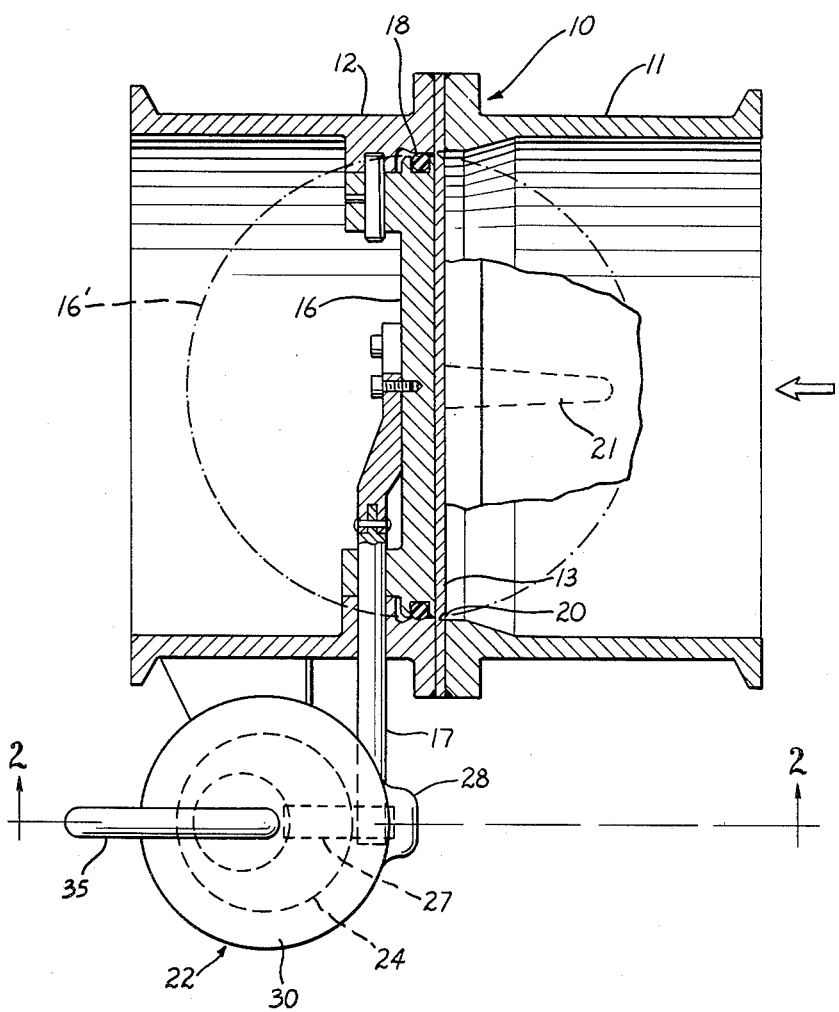
FIGURE 1 is a top plan partially cutaway view of the valve body and associated valve preloading device.
Figure 2:
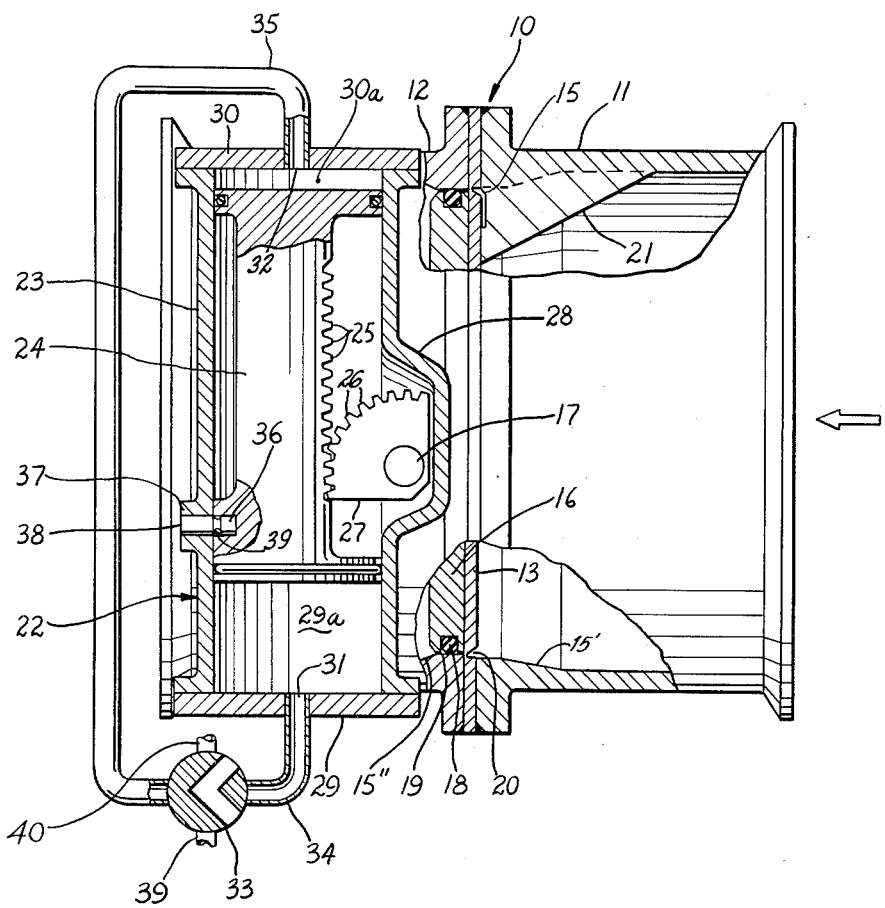
FIGURE 2 is a vertical section on line 2—2 of FIGURE 1, showing, in partial cutaway, the movable valve member in closed position.

Referring now in detail to the drawings, wherein like reference characters designate corresponding parts in the several views, it will be observed that the illustrative embodiment of my improved valve includes a hollow valve body 10 which is divided into sections 11 and 12 in order that the marginal edge of a flat circular shearable sealing sheet 13 of frangible material may be clamped between them in a wall-to-wall hermetic sealing relation by suitable means, such as bolts.

In relation to the direction of fluid flow, upstream valve body section 11 may be termed the "forward body section" and the downstream valve body section 12 the "aft body section." Both valve body sections have substantially cylindrical lateral walls of equal inside diameter providing an interior fluid-conducting chamber.

The lateral walls of the respective body sections 11 and 12 are shown as being constricted at the adjacent ends thereof to form component half portions 15' and 15" of an annular valve seat 15.

A butterfly-type movable valve member 16 in the form of a flat circular disk is medially affixed for oscillation between closed position in contact with valve seat 15 and open position feathered in the fluid stream to a horizontal valve-mounting shaft 17 that is journaled in valve body 10 on a transverse axis intersecting the longitudinal axis of said valve body. Movable valve member 16 is caused to adhere closely to shearable hermetic sealing sheet 13 by suitable means such as welding. In order that opening and closing torque may be applied to movable valve member 16 from outside valve body 10, at least one end of valve-mounting shaft 17 is caused to protrude radially outward from said valve body.

An elastic sealing ring 18, such as an "O-ring," is partially recessed in a groove 19 provided in the rim of movable valve member 16 for non-hermetic sealing contact with half-portion 15" of valve seat 15 both before and after the hermetic sealing sheet 13 has been sheared. The upstreamward face of shearable hermetic sealing sheet 13 is scored on a circular shear-line substantially flush with half-portion 15' of valve seat 15 to provide a notch 20 that partially penetrates the thickness of said sheet 13 but not enough to affect its hermetic sealing effectiveness.

Fluid in the line on the upstreamward side of movable valve member 16 exerts pressure directly against shearable hermetic sealing sheet 13. As previously stated herein, this pressure during any surge in the line may be sufficiently high to rock valve member 16 on its pivotal axis and cause some damage to hermetic sealing sheet 13, or even shearing action that will break the hermetic seal. Therefore, as an essential component of my valve preloading means, I have provided a strong and rigid stop abutment 21 inside valve body 10 at the upstream side of movable valve member 16 in a position for limiting contact in the closed position of said valve member with the upper edge portion of shearable hermetic sealing sheet 13, i.e. the edge which swings downstreamward into aft body section 12 when the valve opens.

Located externally with respect to valve body 10 is an operating mechanism 22 that oscillates movable valve member 16 between open and closed positions through the medium of valve-mounting shaft 17. Valve-operating mechanism 22 may be mounted on valve body 10, as shown, or it may have any other suitable means of support provided that the latter is rigid with respect to said valve body.

Valve-operating mechanism 22 cooperates with stop abutment 21 as the other component of the combined valve loading means and includes a dual-purpose cylinder 23 that is mounted rigid with valve body 10. The primary purpose of cylinder 23 is to guide in rectilinear reciprocating movement a rack 24 having a straight row of teeth 25 arranged tangential to, and in operative engagement with, the toothed periphery 26 of a gear segment, or pinion, 27 which is attached to the end of valve-mounting shaft 17 that protrudes externally from valve body 10.

For reasons which will be explained presently, it is desired to make cylinder 23 fluid-tight, so toothed rack 24 is housed within an outwardly bulged portion, or blister, 28 of the side wall of said cylinder, which is penetrated in fluid-sealed manner by valve-mounting shaft 17.

The drawing shows rack 24 and pinion 27 at one limit of their combined movement in which movable valve member 16 is closed and hermetic sealing sheet 13 is firmly abutting stop abutment 21. This position is urged by preloading movable valve member 16 and as the preloaded position is reached, shear pin 38 is slid through the wall of cylinder 23 into a recess in rack 24 to hold rack 24 in the preloaded position. Any one of several available and equivalent means may be adopted for this purpose, such as hydraulic, electrical or mechanical means. As an illustrative example, hydraulic preloading means combined with mechanical shear pin stop 38 is shown in the drawing. Accordingly, the secondary purpose of cylinder 23 is to make it possible to utilize hydraulic fluid as the impulse transmitting medium in preloading movable valve member 16.

Cylinder 23 is closed at its bottom end by a head 29 and at its top by a head 30. Preloading fluid under the required pressure is admitted to the bottom head space 29a of cylinder 23 through inlet port 31 or is vented through port 31 and vent outlet 39 under selective control by valve 33. Valve-opening fluid, under pressure, is admitted to the top head space 30a through inlet port 32 also under control of valve 33, a three-way type that is connected to ports 31, 32 and vent 39, respectively, by conduits 34, 35 and 34. For this secondary purpose of cylinder 23, rack 24 is shaped and fitted to serve as a piston.

In order that rack 24 may be temporarily positively secured in the valve-closed preloaded position, the said rack is, as previously mentioned, provided with a peripheral radial socket 36 which is constructed and arranged to register with a radial through hole 37 in the side wall of cylinder 23 when movable valve member 16 is precisely in completely closed position with shearable hermetic sealing sheet 13 bearing hard against stop abutment 21 inside valve body 10. In this hermetically sealed condition of movable valve member 16, the shearable securing pin 38 of frangible material may be inserted in cylinder hole 37 and rack socket 36. Securing pin 38 has a shear-line peripheral notch 39 which, in the assembled position of said pin, will be flush with the abutting peripheral bearing faces of rack 24 and cylinder 23. The strength of securing pin 38 should be such that it will not be sheared off under preload static or shock conditions but will be sheared off when a substantial pressure of valve-opening hydraulic fluid has been applied to the top face of rack 24.

To preload the valve, a load is applied to rack-piston 24 by admitting pressurized fluid through inlet port 31 into bottom head space 29a of cylinder 23. This may be accomplished by adjustment of valve 33 either manually or by remote control, as the case may be, to admit fluid from a source of fluid under pressure. When valve 33 is thus adjusted, fluid pressure in bottom head space 29a will force rack 24 upward to oscillate pinion 27 clockwise until it reaches the limit of its throw shown in FIGURE 3. The torque thus applied to movable valve member 16 will press shearable hermetic sealing sheet 13 hard against stop abutment 21 in balanced relation to fluid pressure in the upstream inlet portion of valve body 10 to effectively prevent damage to the said sealing sheet by surge. At this time securing shear pin 38 is installed in cylinder hole 37 and rack socket 36. Valve 33 is then adjusted to the "vent" position and fluid flows from bottom head space 29a through conduit 34 through valve 33 and out through vent 39.

Now, when the time comes to open the movable valve member 16 and break the hermetic seal, a substantial hydraulic pressure is applied to the upper end of rack 24 by adjusting valve 33 in a manner to admit, from the pressure source connected to valve inlet 40, pressurized hydraulic fluid to the top head space 30a through inlet port 32. The valve-opening pressure load is sufficient to shear pin 38 thus releasing the rack 24 in its cylinder bearing, and the said rack is forced downward to oscillate pinion 27 counter-clockwise and move valve member 16 into its open position feathered in the released fluid stream through valve body 10. The valve may thereafter be opened and closed as often as desired but without benefit of the hermetic seal.

While there have been shown and described and pointed out the fundamental novel features of this invention as applied to a single structural embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. A hermetically sealed butterfly valve comprising a valve body having a substantially cylindrical lateral wall providing an interior fluid-conducting chamber including an upstreamward inlet end and a downstreamward outlet end, an annular valve seat provided on the inner periphery of the valve body wall, an initially effective flat shearable hermetic sealing sheet of frangible material installed in closing relation to the valve seat and in hermetically sealed union with the valve body, a substantially diametrical valve-mounting shaft journaled in the valve body and having at least one end protruding externally from said body, a movable valve member in the form of a circular disk affixed to the valve-mounting shaft and also affixed to the downstreamward face of the hermetic sealing sheet, a stop abutment fixedly supported inside the valve body in a position to abut the upstreamward face of the hermetic sealing sheet when the valve is in closed position, valve-operating means connected to the externally protruding end of the valve-mounting shaft and adapted to move the valve member between open and closed positions, and means to preload the valve-operating means in a manner and to such a degree that the movable valve member and affixed hermetic sealing sheet will be pressed hard against the stop abutment in closed position, whereby surge in the fluid contents of the inlet end of the valve body will be prevented from shearing the hermetic sealing sheet.

2. The invention as defined in claim 1, to which is added valve-opening load means by which the valve-closing pre-loading means may be overcome to open the valve member and shear the sealing sheet.

3. The invention defined in claim 2 to which is added shearable means by which the valve operating means may be secured positively in valve-closed position, said securing means being shearable by the valve-opening load means.

4. The invention defined in claim 1, wherein the valve-operating means includes a cylinder mounted in stationary relationship to the valve body, a pinion affixed to the external end portion of the valve-mounting shaft for oscillation therewith, and a reciprocating rack having a straight row of teeth in mesh with the teeth of the shaft-carried pinion and being arranged for sliding movement at a tangent to said pinion.

5. The invention defined in claim 4, to which is added valve-opening load means by which the preload means may be overcome to open the valve member and shear the sealing sheet.

6. The invention defined in claim 5, wherein the cylinder and sliding rack are provided with holes arranged at right angles to the direction of reciprocation of said rack and to register when the movable valve member is in closed position, and wherein a peripherally scored shearable securing pin is fitted in the registering holes in the valve closed preloaded position, said securing pin being of frangible material and adapted to be sheared upon application of overcoming load by the valve opening load means.

7. The invention defined in claim 1, wherein the valve-operating means includes a cylinder mounted in stationary relationship to the valve body, a pinion affixed to the external end portion of the valve-mounting shaft for oscillation therewith, and a reciprocating rack having a straight row of teeth in mesh with the teeth of the shaft-carried pinion and being arranged for sliding movement in said cylinder at a tangent to said pinion and being shaped and fitted to serve as a piston, and wherein one end of the cylinder is closed by a bottom head and the means to preload the valve-operating means includes means to admit fluid under preloading pressure into the space between said bottom head and the rack-piston in a manner to close the movable valve member.

8. The invention defined in claim 7, wherein a top head is provided to close the opposite end of the cylinder, and wherein means is added to admit fluid under pressure between the top head and the rack-piston and to vent the cylinder space between the bottom and the rack-piston when it is desired to open the movable valve member.

References Cited in the file of this patent

UNITED STATES PATENTS

| | | |
|---|---|---|
| 1,796,200 | Grieshaber | Mar. 10, 1931 |
| 2,154,827 | Wangenheim | Apr. 18, 1939 |
| 2,946,553 | Adam | July 26, 1960 |